United States Patent
Ross

(10) Patent No.: US 7,430,650 B1
(45) Date of Patent: Sep. 30, 2008

(54) GENERATING A SET OF PRE-FETCH ADDRESS CANDIDATES BASED ON POPULAR SETS OF ADDRESS AND DATA OFFSET COUNTERS

(75) Inventor: Richard A. Ross, Berkeley, CA (US)

(73) Assignee: Richard Ross, Berkeley, CA (US)

( * ) Notice: Subject to any disclaimer, the term of this patent is extended or adjusted under 35 U.S.C. 154(b) by 267 days.

(21) Appl. No.: 11/151,801

(22) Filed: Jun. 13, 2005

Related U.S. Application Data

(60) Provisional application No. 60/581,134, filed on Jun. 17, 2004.

(51) Int. Cl.
*G06F 12/00* (2006.01)
(52) U.S. Cl. .................. 711/213; 711/137; 712/207
(58) Field of Classification Search ............ 711/137, 711/213
See application file for complete search history.

(56) References Cited

U.S. PATENT DOCUMENTS 6,173,392 B1 * 1/2001 Shinozaki ............... 712/207
6,311,260 B1 * 10/2001 Stone et al. .............. 711/213
6,636,945 B2 * 10/2003 Nakamura ............... 711/137
6,976,147 B1 * 12/2005 Isaac et al. .............. 711/205

* cited by examiner

*Primary Examiner*—Kevin Ellis
*Assistant Examiner*—Kalpit Parikh
(74) *Attorney, Agent, or Firm*—Fernandez & Associates, LLP

(57) ABSTRACT

Cache prefetching algorithm uses previously requested address and data patterns to predict future data needs and prefetch such data from memory into cache. A requested address is compared to previously requested addresses and returned data to compute a set of increments, and the set of increments is added to the currently requested address and returned data to generate a set of prefetch candidates. Weight functions are used to prioritize prefetch candidates. The prefetching method requires no changes to application code or operation system (OS) and is transparent to the compiler and the processor. The prefetching method comprises a parallel algorithm well-suited to implementation on an application-specific integrated circuit (ASIC) or field-programmable gate array (FPGA), or to integration into a processor.

20 Claims, 3 Drawing Sheets

GENERATING A SET OF PRE-FETCH ADDRESS CANDIDATES BASED ON POPULAR SETS OF ADDRESS AND DATA OFFSET COUNTERS

CROSS-REFERENCE TO RELATED APPLICATION

This patent application is a conversion of U.S. provisional application Ser. No. 60/581,134, filed Jun. 17, 2004; pending, the priority date of which is claimed and the disclosure of which is incorporated by reference.

FIELD OF INVENTION

Invention relates to caching in a computer system, and in particular to processor-cache prefetching algorithms that are transparent to compiler and processor.

BACKGROUND OF INVENTION

Processor performance is an important metric in computing systems. The current state of the art is at a limit where speeding up the processor clock will minimally affect actual performance. The gating factor is the processor-cache miss rate. For example, at a processor clock rate of 3 GHz, a cache miss may cost about 300-450 clock cycles. Assuming 25% of the instructions are LOAD instructions, at a 2% cache miss rate the average number of cycles per instruction (CPI) increases from 1 to 1+(25%)(2%)(400)=3, resulting in three times slower processor performance.

Furthermore, servers today execute pointer-rich application environments (such as Java or .Net) which are generally accompanied by even lower processor-cache performance, as shown for example by cache miss rates of 4% in some instances (and resulting, a number of years ago, in suggestions to eliminate processor data caches altogether in pointer-rich execution environments, such as Artificial Intelligence systems).

Note that halving the cache miss rate on a 3 GHz processor with a 2% level-two processor-cache (L2 cache) miss rate results in performance equivalent to speeding up the processor clock rate to 10 GHz (holding other factors the same), in other words in "virtual over-clocking" with no side effects.

Conventional processor-cache prefetching algorithms require the compiler to produce specific prefetch instructions, or turn on bits in the generated assembly code, as the compiler is compiling the source code. Accordingly, there is a need for a processor-cache prefetching algorithm that requires no extra work from the compiler or the processor and is transparent to them, and requires no advance knowledge from the programmer.

SUMMARY OF INVENTION

Cache prefetching algorithm uses previously requested address and data patterns to predict future data needs and prefetch such data from memory into cache. A requested address is compared to previously requested addresses and returned data to compute a set of increments, and the set of increments is added to the currently requested address and returned data to generate a set of prefetch candidates. Weight functions are used to prioritize prefetch candidates. The prefetching method requires no changes to application code or operation system (OS) and is transparent to the compiler and the processor. The prefetching method comprises a parallel algorithm well-suited to implementation on an application-specific integrated circuit (ASIC) or field-programmable gate array (FPGA), or to integration into a processor.

DETAILED DESCRIPTION

When a processor requests the contents of a memory address, the requested content may or may not be cached. If the contents do reside in a cache, they are given to the processor and no access to the main (non-cache) memory is needed. If the requested contents are not cached, a memory read is performed to fetch, as well as optionally to replicate in the cache, the requested contents. In addition, contents of a number of other memory addresses may be prefetched in anticipation of future processor requests. A caching algorithm, a corresponding prefetch algorithm (used by the caching algorithm), a candidate generator algorithm for generating a set of prefetch address candidates (used by the prefetching algorithm) and a set of data structures used by the algorithms are described in what follows, according to an embodiment of the present invention.

Abstractly, the caching algorithm takes a history set H comprising a set of previously loaded address and data pairs $\{a_i, d_i\}$, as well as a set $\{A_{req}, D_{req}\}$ comprising the most current requested address and corresponding data, and computes a prefetch set $P=F(H, \{A_{req}, D_{req}\})$ comprising a set of addresses to be prefetched, wherein F is the prefetch calculation function. The prefetch set P is then loaded into cache, and H is updated to H union $\{A_{req}, D_{req}\}$. The following is a piece of pseudo-code illustrating one embodiment of the caching algorithm:

1. for each $\{a_i, d_i\}$ in H, compute
    $\Delta a_i = A_{req} - a_i$;
    $\Delta d_i = A_{req} - d_i$;
2. for the values obtained in step 1, compute (by sorting, for example)
    the N most popular $\Delta a_i$'s and
    the M most popular $\Delta d_i$'s.
3. add the N $\Delta a_i$'s to $A_{req}$ to get a first set of prefetch addresses;
4. if $D_{req}$ represents a valid address
    add the M $\Delta d_i$'s to the returned data to get a second set of prefetch addresses;
5. return the two sets of prefetch addresses as set P, and update H to H union $\{A_{req}, D_{req}\}$;

Note that the caching algorithm is not restricted to processor caches, but can be applied wherever caching is performed and retrieved data records and/or objects comprise information pointing to other data records and/or objects.

Figure 1:
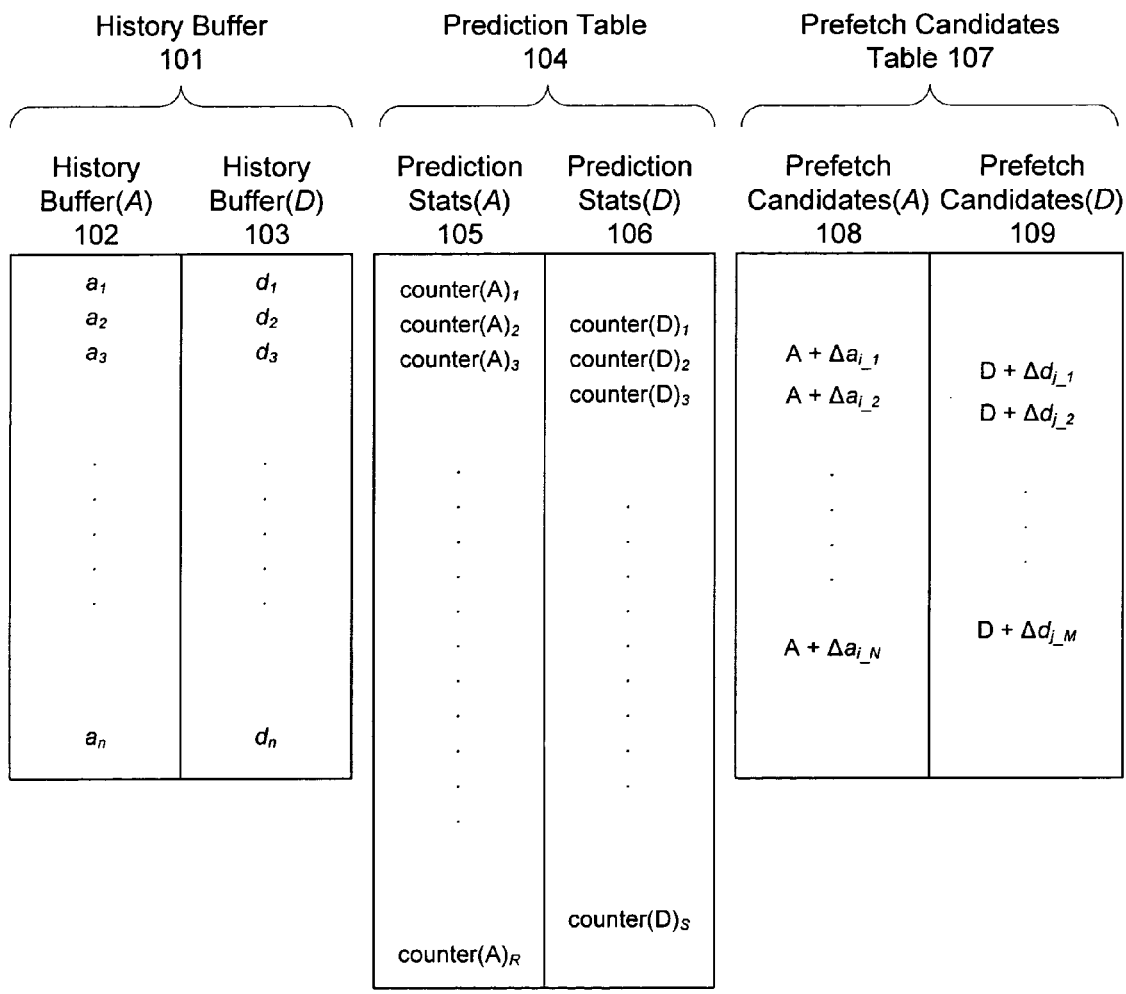
FIG. 1 is a diagram illustrating a History Buffer, a Prediction Table and a Prefetch Candidates Table, according to an embodiment of the present invention.

FIG. 1 is a diagram illustrating a History Buffer 101, a Prediction Table 104 and a Prefetch Candidates Table 107, according to an embodiment of the present invention. History Buffer 101 stores a set of the most recently requested {address, data} pairs requested by a processor, with History Buffer(A) 102 comprising the set of most recently requested memory addresses $a_i$, and History Buffer(D) 103 comprising the corresponding set of most recently requested data $d_i$, wherein $d_i$ represents the contents of memory address $a_i$. Prediction Table 104 and Prefetch Candidates Table 107 are described below in conjunction with the algorithms.

Figure 2:
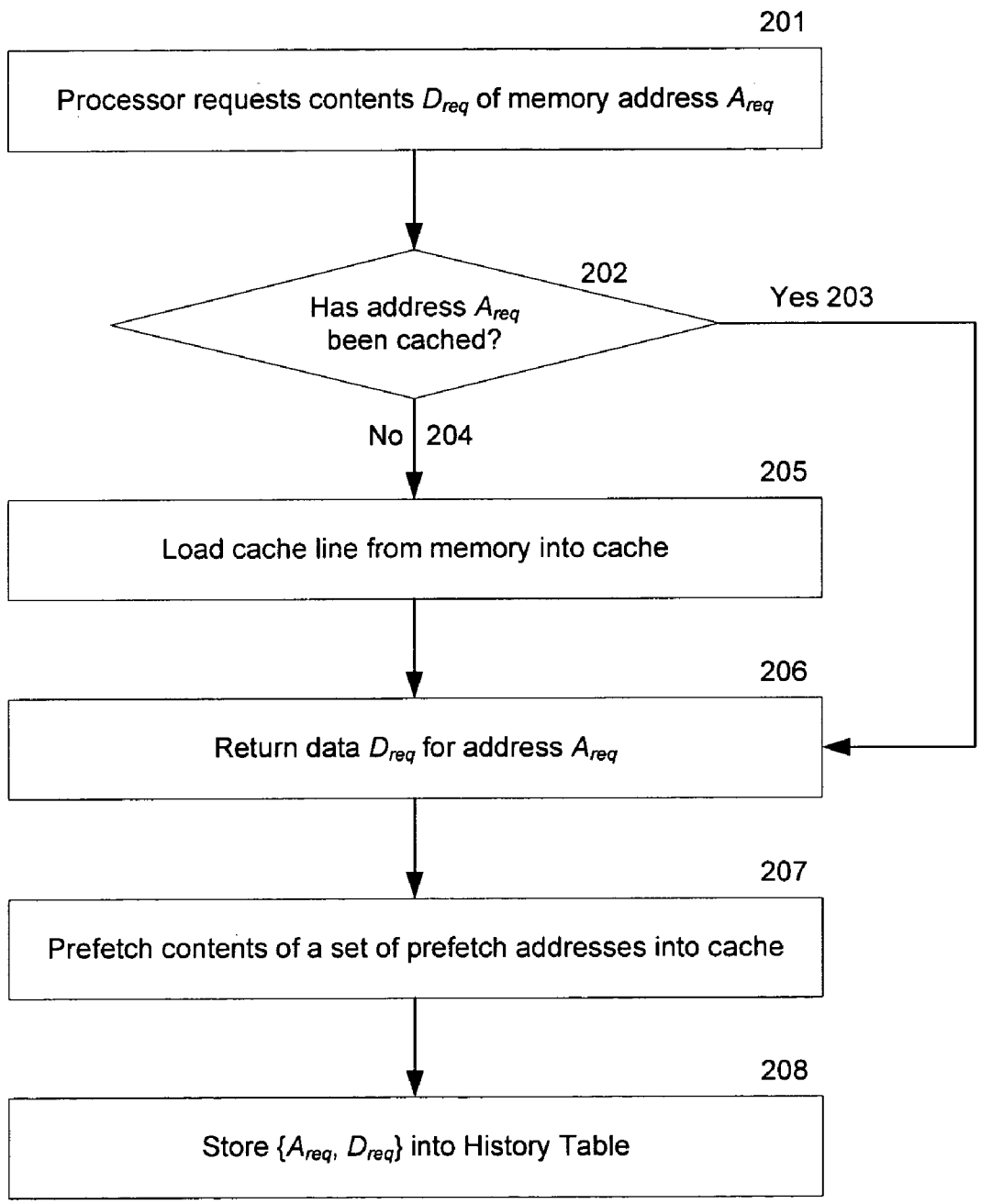
FIG. 2 is a flow chart illustrating a caching method, according to an embodiment of the present invention.

FIG. 2 is a flow chart illustrating a caching method, according to an embodiment of the present invention. When a processor requests 201 the contents $D_{req}$ (denoting the requested data) of a memory address $A_{req}$ (denoting the requested address), the Caching Algorithm determines 202 whether the data at $A_{req}$ is present in the cache. If yes 203, the data $D_{req}$ residing the cache is 206 made available to the processor.

If, however, the pair $\{A_{req}, D_{req}\}$ is not 204 represented in the cache, the Caching Algorithm loads 205 a corresponding cache line (comprising $D_{req}$ at memory address $A_{req}$) into the cache, and makes 206 the requested data $D_{req}$ available to the processor. (Note that when the cache line size is greater that the word size, the loaded cache line will comprise more than just the requested data $D_{req}$).

The Caching Algorithm then prefetches 207 contents of a set of prefetch addresses into the cache, wherein the set of prefetch addresses is generated by a Prefetch Algorithm (described below). Finally, the Caching Algorithm stores 208 the pair $\{A_{req}, D_{req}\}$ into History Table 101 (or stores $\{A_{req}, 0\}$ if $D_{req}$ doesn't represent a valid address), removing the oldest {address, data} pair from History Buffer 101 if History Buffer 101 would have overflowed.

Note that History Table 101, Prediction Table 104 and/or Prefetch Candidates Table 107 can be implemented in software or hardware. For example, in a software implementation, a circular buffer can be used as a FIFO (first in, first out) data structure. As another example, in a hardware implementation (such as in an ASIC, FPGA or integrated on the processor), a parallel shifter can be used as a FIFO.

Optionally, the Caching algorithm determines whether $D_{req}$ represents an address (such as a pointer into the heap). This determination is performed, for example, by comparing $D_{req}$ to the heap boundaries (taking into account any expansion and/or migration of the heap) or by asking a garbage collector (if available). If $D_{req}$ does not represent an address, it is not stored into History Table 101 in step 208, and instead a dummy value (for example zero) is stored as the data portion in step 208. If $D_{req}$ does represent an address, it is stored into History Table 101 as described above.

The Prefetch Algorithm generates the prefetch addresses used by the Caching Algorithm. The Prefetch Algorithm (hereinafter also referred to as Prefetcher) obtains a set of prefetch address candidates (generated and scored by a Candidate Generator Algorithm, described below). The received prefetch address candidates are prefetched into the cache. The actual number of candidates to be prefetched is a function of memory access time and to be tuned such that (1) as many candidates as possible are prefetched while (2) keeping prefetch activity low enough to prevent interruption of prefetch requests by real (i.e. non-prefetch) load instructions.

Figure 3:
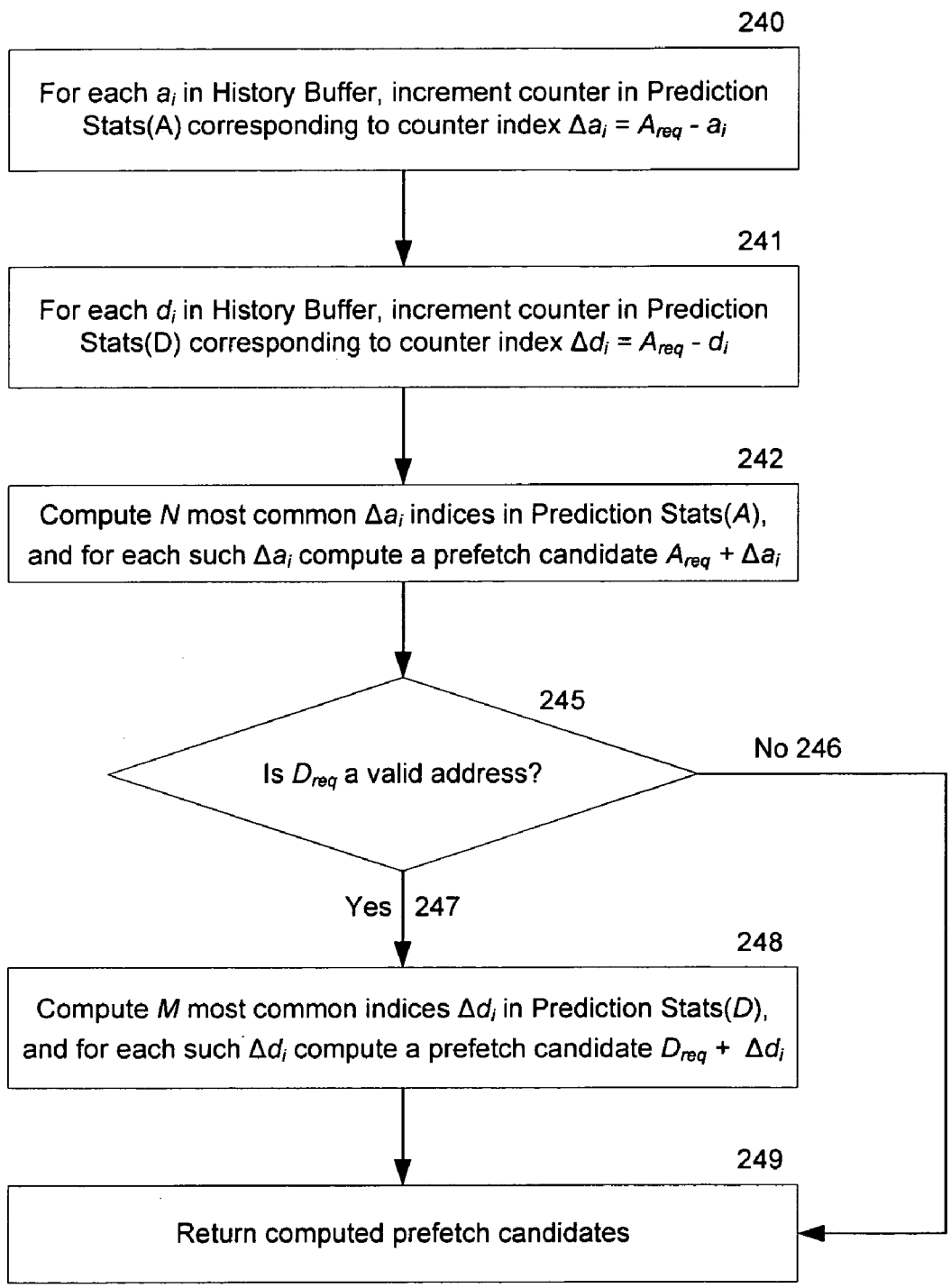
FIG. 3 is a flow chart illustrating a method for generating prefetch addresses, according to an embodiment of the present invention.

FIG. 3 is a flow chart illustrating a method for generating and scoring prefetch addresses, according to an embodiment of the present invention. The Candidate Generator Algorithm (hereinafter also referred to as Generator) shown in this Figure first uses the requested address $A_{req}$ and the History Table 101 to populate the Prediction Table 104, and then uses the requested address and data pair $\{A_{req}, D_{req}\}$ and the populated Prediction Table 104 to generate a set of prefetch address candidates for use by the Prefetcher, as described in the following.

Prediction Table 104 stores a set of address offset counters $\{counter(A)_1 \ldots, counter(A)_R\}$ and data offset counters $\{counter(D), \ldots, counter(D)_S\}$ indexed by a set of differences $\{\Delta a_i\}$ and $\{\Delta d_i\}$ as follows. The Generator first computes a set of differences $\{\Delta a_i\}$ and $\{\Delta d_i\}$ between the requested address $A_{req}$ and the address and data pairs $\{a_i, d_i\}$ currently stored in the History Buffer 101, and updates the respective indexed counters in Prediction Table 104 according to the computed differences. In particular, for each $a_i$ in History Buffer 101, the Generator computes 240 the difference $\Delta a_i = A_{req} - a_i$ and increments the counter indexed by $\Delta a_i$ in Prediction Stats(A) 105 (as shown in FIG. 1). Similarly, for each $d_i$ in History Buffer 101, the Generator computes 241 the difference $\Delta d_i = A_{req} - d_i$ and increments the counter indexed by $\Delta d_i$ in Prediction Stats(D) 105 (note that in step 241 $d_i$ is subtracted from $A_{req}$, and not from $D_{req}$). Note that optionally steps 240 and 241 can be performed in parallel. Prediction Stats(A) 105 and Prediction Stats(B) 106 are implemented in a space-efficient fashion, keeping counts of deltas within a practical range, for example in the range of −128 to +128 for Prediction Stats(A) 105 and in the range of −64 to +64 for Prediction Stats(D) 106.

The Generator then computes 242 a set of the N highest counters in Prediction Stats(A) 105 and adds the corresponding (N most common) counter(A) indices $\{\Delta a_{i\_1}, \ldots, \Delta a_{i\_N}\}$ to the requested address $A_{req}$ to obtain a first set of N prefetch address candidates $\{A_{req} + \Delta a_{i\_1}, \ldots, A_{req} + \Delta a_{i\_N}\}$. N is a tunable number. If $D_{req}$ indicates 247 a valid address (i.e. represents a valid pointer) the Generator similarly computes 248 a set of the M highest counters in Prediction Stats(D) 106 and adds the corresponding (M most common) counter(D) indices $\{\Delta d_{j\_1}, \ldots \Delta d_{j\_M}\}$ to $D_{req}$ to obtain a second set of M prefetch address candidates $\{D_{req} + \Delta d_{j\_1}, \ldots, D_{req} + \Delta d_{j\_M}\}$. The Generator returns 249 the union of these two sets of prefetch address candidates to the Prefetcher, as described above. Optionally, the additions in steps 242 and 248 can be performed in parallel.

Optionally, different processes, executables, applications and/or parts of applications have their own associated History Tables 101 and Prediction Tables 104. The tables can be swapped in and out (a) as the processes, executables, applications and/or parts of applications are swapped in and out of memory and/or execution, or (b) when transitioning between execution stage and garbage collection stage. This is useful since garbage collection potentially pollutes the cache, and hence the Prediction Table 104.

Optionally, one or more operating system hooks are provided, such as a system call for pre-populating the Prediction Table 104 according to a known memory access behavior or a desired prefetching behavior, or a system call for switching from one Prediction Table 104 to another one, for example when switching from a spreadsheet application to a work processing application.

Optionally, the counters stored in the Prediction Table 104 are incremented by weights, with the weights representing a generalization of the notion of "most common" Δ-values described in steps 242 and 248 above. For example, weights can be assigned according to the "age" of the Δ-values (wherein age of a Δ-value is a measure of how many clock-cycles have passed, instructions have been executed, or load misses have occurred, since the Δ-value was computed by the Generator) in order to "depreciate" the Δ-values, wherein the weight of a Δ-value is (a) computed by scaling the age of the Δ-value by some constant, or (b) is logarithmically based on the age of the Δ-value, or (c) has an inverse relationship to the age of the Δ-value, for example by scaling the age by a negative constant, or by scaling a logarithmic function of the age by a negative constant, or (d) using any other function for assigning a weight to a Δ-value. Note that for example option (c) assigns more weight to older Δ-values, preventing prefetches that are too late. More generally, the weights can be tuned so as to cause effective prefetches based on Δ-values that are neither too old nor too new. As another example, Δ-values leading to prefetching data that were never needed can be demoted.

The code snippet below illustrates above algorithms. An optional "weight" represents an input parameter to the scoring routines. As indicated, "weight" may be a constant 1, a function of the number of instructions since beginning of program, a number of loads, or a combination of these, and is used to "age" old possible offsets such that newer values have greater weight and will occur in candidates more frequently. As a program executes, the list of preferred candidates evolves.

```
#define N 3// number of direct elements to prefetch
#define M 2// number of indirect elements to prefetch
Prefetch(ADDRESS A_req, DATUM D_req, int instructionCounter)
{
    ADDRESS prefetchAddresses[N+M];
    int prefetchCnt;
    // weight may be used to tune scoring routines
    int weight = 1;
        // or may be # of loads, or # instructions, or log or square
            of these, e.g.
    // get the M,N most popular candidates
    prefetchCnt = GeneratePrefetchAddrs(A_req, D_req,
        instructionCounter, weight, &prefetchAddresses(0)};
    //prefetch M direct (A+offset) and N indirect (D+offset)
        data
    PrefetchIntoCache(prefetchCnt, &prefetchAddresses[0]);
    UpdateHistoryBuffer(A_req,       LooksLikeGoodAddress
        (D_req) ? D_req : 0, instructionCounter);
}
int GeneratePrefetchAddrs(ADDRESS A_req, DATUM
    D_req, int iCtr, int weight, ADDRESS *addrP)
{
    int directOffsets[N];
    int indirectOffsets[M];
    int prefetchCnt = 0;
    int i;
    // update scores of prefetch candidates using actual
        requested address
    // Note that D_req is not needed by the scoring routine
    UpdateCandidateScores(A_req, weight, iCtr);
    // get the N,M most popular candidates
    GetBestCandidates(N, &directOffsets[0], M, &indirect-
        Offsets[0]);
    //use offsets to calculate prefetch addresses
    for (i = 0; i < N; i++)
        *addrP++ = A_req + directOffsets[i];
    prefetchCnt = N;
    if (LooksLikeGoodAddress(D_req)){
        for (i = 0; i < M; i++)
            *addrP++ = D_req + indirectOffsets[i];
        prefetchCnt += M;
    }
    return prefetchCnt;
}
int directCnts[OFFSET_TABLE_SIZE];
int indirectCnts[OFFSET_TABLE_SIZE];
void UpdateCandidateScores(ADDRESS addr, int weight,
int instructionCounter)
{
    foreach (entry E in HistoryBuffer)
    {
        // (may not want too recent -- would have no time to
            prefetch)
        if (TooOldOrTooRecent(E.instructionCounter, instruc-
            tionCounter))
            continue; // skip next if history too early or late to be
                useful
        deltaDirect = (addr - E.addr);
        if (deltaDirect > MIN_PRED && deltaDirect < MAX-
            _PRED) //update score for this direct (A + offset)
            candidate
            directCnts[deltaDirect - MIN_PRED]+= weight;
        if (E.datum == 0) continue; // skip next if prior D had not
            been good pointer
        deltaIndirect = (addr - E.datum);
        if (deltaIndirect > MIN_PRED && deltaIndirect <
            MAX_PRED) //update score for this indirect (D +
            offset) candidate
            indirectCnts[deltaIndirect - MIN_PRED]+=weight;
    }
}
void GetBestCandidates(int directWanted, int * directOff-
sets, int indirectWanted, int *indirectOffsets)
{
    //for each of the directWanted (M) biggest entries in
        directCnts, get its index = offset)
    GetIndicesOfBigValues(directCnts,   OFFSET_TABLE-
        _SIZE, directWanted, directOffsets);
    //for each of the indirectWanted (N) biggest entries in
        indirectCnts, get its index = offset)
    GetIndicesOfBigValues(indirectCnts, OFFSET_TABLE-
        _SIZE, indirectWanted, indirectOffsets);
}
void UpdateHistoryBuffer(ADDRESS addr, DATUM datum,
int instructionCounter)
}
    if (HistoryFull( ))
        RemoveFromEndOfHistory( );
    AddToFrontOfHistory(addr, datum, instructionCounter);
}
void PrefetchIntoCache(int cnt, ADDRESS * addrP)
{ int i;
    for (i = 0; i < cnt; i++)
        LoadIntoCache(addrP[i]);
}
```

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A cache prefetch method, comprising the steps of:
   (a) computing a first set of prefetch address candidates based on previously requested addresses, wherein the computing step (a) comprises:
   (a1) computing differences between a requested address and the previously requested addresses;
   (a2) incrementing address offset counters corresponding to the computed differences;
   (a3) computing a set of N highest address offset counters, wherein N is a positive integer; and
   (a4) adding the computed differences corresponding to the set of N highest address offset counters to the requested address to obtain the first set of prefetch address candidates; and
   (b) computing a second set of prefetch address candidates based on previously requested data that comprised addresses; and
   (c) returning a union of the first and second sets of prefetch address candidates;
   wherein the computing step (a) and the computing step (b) are performed in parallel, and wherein the previously requested addresses and the previously requested data are predetermined based on known memory access behavior or desired prefetching behavior.

2. The method of claim 1, wherein N is a tunable number.

3. The method of claim 1, wherein the computing step (a) further comprises:
   (a5) including the requested address in the previously requested addresses.

4. The method of claim 1, wherein at least one of the address offset counters is weighted.

5. A cache prefetch method, comprising the steps of:
   (a) computing a first set of prefetch address candidates based on previously requested addresses;
   (b) computing a second set of prefetch address candidates based on previously requested data that comprised addresses residing at the previously requested addresses, wherein if data for a requested address comprises a valid address, then the computing (b) comprises:
   (b1) computing differences between the requested address and the previously requested data that comprised valid addresses;
   (b2) incrementing data offset counters corresponding to the computed differences;
   (b3) computing a set of M highest data offset counters, wherein M is a positive integer; and
   (b4) adding the computed differences corresponding to M highest data offset counters to the data of the requested address to obtain the second set of prefetch address candidates; and
   (c) returning a union of the first and second sets of prefetch address candidates.

6. The method of claim 5, wherein M is a tunable number.

7. The method of claim 5, wherein the computing step (b) further comprises:
   (b5) including the data for the requested address in the previously requested data.

8. The method of claim 5, wherein at least one of the data offset counters is weighted.

9. A computer readable medium with program instructions for a cache prefetch, comprising instructions for:
   (a) computing a first set of prefetch address candidates based on previously requested addresses, wherein the computing instruction (a) comprises instructions for:
   (a1) computing differences between a requested address and the previously requested addresses;
   (a2) incrementing address offset counters corresponding to the computed differences;
   (a3) computing a set of N highest address offset counters, wherein N is a positive integer; and
   (a4) adding the computed differences corresponding to the set of N highest address offset counters to the requested address to obtain the first set of prefetch address candidates;
   (b) computing a second set of prefetch address candidates based on previously requested data that comprised addresses; and
   (c) returning a union of the first and second sets of prefetch address candidates;
   wherein the computing instruction (a) and the computing instruction (b) are executed in parallel, and wherein the previously requested addresses and the previously requested data are predetermined based on known memory access behavior or desired prefetching behavior.

10. The medium of claim 9, wherein N is a tunable number.

11. The medium of claim 9, wherein the computing instruction (a) further comprises instructions for:
    (a5) including the requested address in the previously requested addresses.

12. The medium of claim 9, wherein at least one of the address offset counters is weighted.

13. A computer readable medium with program instructions for a cache prefetch, comprising instructions for:
    (a) computing a first set of prefetch address candidates based on previously requested addresses;
    (b) computing a second set of prefetch address candidates based on previously requested data that comprised addresses residing at the previously requested addresses, wherein if data for a requested data comprises a valid address, then the computing instruction (b) comprises instructions for:
    (b1) computing differences between the requested address and the previously requested data that comprised valid addresses;
    (b2) incrementing data offset counters corresponding to the computed differences;
    (b3) computing a set of M highest data offset counters, wherein M is a positive integer; and
    (b4) adding the computed differences corresponding to M highest data offset counters to the data of the requested address to obtain the second set of prefetch address candidates; and
    (c) returning a union of the first and second sets of prefetch address candidates.

14. The medium of claim 13, wherein M is a tunable number.

15. The medium of claim 13, wherein the computing instruction (b) further comprises instructions for:
    (b5) including the data for the requested address in the previously requested data.

16. The medium of claim 13, wherein at least one of the data offset counters is weighted.

17. A memory controller, comprising: a processor;
    (a) means for computing a first set of prefetch address candidates based on previously requested addresses, wherein the means for computing the first prefetch address candidates comprises:
    (a1) means for computing differences between a requested address and the previously requested addresses;
    (a2) means for incrementing address offset counters corresponding to the computed differences;

(a3) means for computing a set of N highest address offset counters, wherein N is a positive integer; and (a4) means for adding the computed differences corresponding to the set of N highest address offset counters to the requested address to obtain the first set of prefetch address candidates;

(b) means for computing a second set of prefetch address candidates based on previously requested data that comprised at the previously requested addresses; and (c) means for returning a union of the first and second sets of prefetch address candidates.

18. The controller of claim 17, wherein N is a tunable number.

19. A memory controller, comprising: a processor;

(a) means for computing a first set of prefetch address candidates based on previously requested addresses;

(b) means for computing a second set of prefetch address candidates based on previously requested data that comprised addresses residing at the previously requested addresses, wherein the means for computing the second set of prefetch address candidates comprises:

(b1) means for computing differences between the requested address and the previously requested data that comprised valid addresses;

(b2) means for incrementing data offset counters corresponding to the computed differences;

(b3) means for computing a set of M highest data offset counters, wherein M is a positive integer; and (b4) means for adding the computed differences corresponding to M highest data offset counters to the data of the requested address to obtain the second set of prefetch address candidates; and (c) means for returning a union of the first and second sets of prefetch address candidates.

20. The controller of claim 19, wherein M is a tunable number.

* * * * *